J. de YONGH.
Implement for Holding Hot Corn.

No. 201,230.  Patented March 12, 1878.

Witnesses.
Otto Stupeland.
Chas. Wahlers.

Inventor.
John de Yongh
by
Van Santvoord & Hauff
his attys.

UNITED STATES PATENT OFFICE.

JOHN DE YONGH, OF NEW YORK, N. Y.

IMPROVEMENT IN IMPLEMENTS FOR HOLDING HOT CORN.

Specification forming part of Letters Patent No. 201,230, dated March 12, 1878; application filed October 26, 1877.

*To all whom it may concern:*

Be it known that I, JOHN DE YONGH, of the city, county, and State of New York, have invented a new and Improved Implement for Holding Hot Corn, which invention is fully set forth in the following specification, reference being had to the accompanying drawings, in which—

Figure 1:
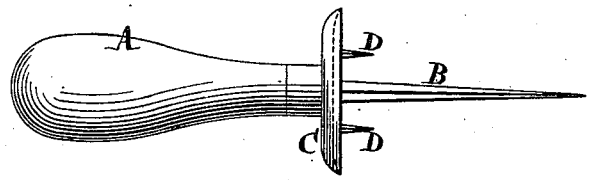
Figure 2:
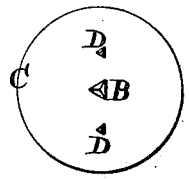
Figure 3:

Figure 1 represents a side view of my improved implement. Fig. 2 is an end view thereof. Fig. 3 shows a modification of one of its parts.

Similar letters indicate corresponding parts.

My invention relates to an implement or device for holding hot corn, so called, in the act of eating or removing the same from the cob; and it consists in a handle, an elongated central pointed shaft or screw, and a guard, said shaft or screw being adapted to enter the pith of the corn, and the guard serving to limit the inward movement thereof, and to protect the hand of the user, so that by taking hold of the handle and causing the shaft or screw to enter the pith of an ear of corn the latter can be held in any position without soiling one's fingers.

It also consists in combining with said handle the elongated central pointed shaft or screw, and said guard, one or more prongs projecting from the guard in the direction of said shaft or screw, so that when the latter is inserted in the pith of an ear of corn the prongs are caused to penetrate the corn-cob, and thus serve to prevent the whole from shifting or turning.

In the drawings, the letter A designates the handle of my implement, from one end and the central part of which projects an elongated pointed shaft, B; and C is a guard interposed between the handle and said shaft, this guard being secured to the end of the handle in any suitable way. In the example shown the shaft B has a polygonal shape in cross-section, so that if it is inserted in the pith of an ear of corn it is not liable to turn; but it can also be made round.

The letter D designates two (more or less) prongs projecting from the guard C on opposite sides of the elongated shaft B, and in the direction of the latter. These prongs D, like the shaft B, have a polygonal shape in cross-section, but they can also be made round.

In order to attach my implement to an ear of corn, I take hold of the handle A, and having brought the corn in a proper position on the dish on which it may be served, I force the shaft B into the pith of the corn at its base end, until the shield C comes in contact with such end, when the corn can be lifted out of the dish and sustained in any position, and hence it can be eaten off the cob or removed therefrom by means of a knife, as the case may be, without soiling one's fingers, as heretofore. I can also attach one of my implements to each end of the corn, if it is desirable, to hold the same with both hands.

When the guard C comes in contact with the end of the corn, as stated, the prongs D are caused to penetrate or enter the corn-cob, so that the whole is thereby effectually prevented from shifting or turning.

In some cases a pointed wire bent to the form of a screw, as shown in Fig. 3, is substituted for the elongated shaft B, this screw being fastened in the pith of the corn by turning the same in the proper direction by means of the handle.

If desired, the point of the shaft or screw B may be covered by a protector of suitable form when my implement is not in use, and the handle A may have a socket for the reception of this protector when it is removed from the shaft or screw.

It will be seen that the guard C, besides serving to limit the inward movement of the shaft or screw A, protects the hand of the person using my implement against accidental contact with the ear of corn that may be attached thereto.

What I claim as new, and desire to secure by Letters Patent, is—

The corn-holder herein described, consisting of the handle A, disk C, elongated central point B, and the short supplementary points D D, substantially as described.

In testimony that I claim the foregoing I have hereunto set my hand and seal this 18th day of October, 1877.

JOHN DE YONGH. [L. S.]

Witnesses:
 W. HAUFF,
 CHAS. WAHLERS.